Aug. 18, 1953  C. M. MAYER  2,649,149
GAS-FUELED BROILER BURNER FOR COOKING RANGES
Filed Dec. 11, 1950  2 Sheets-Sheet 1
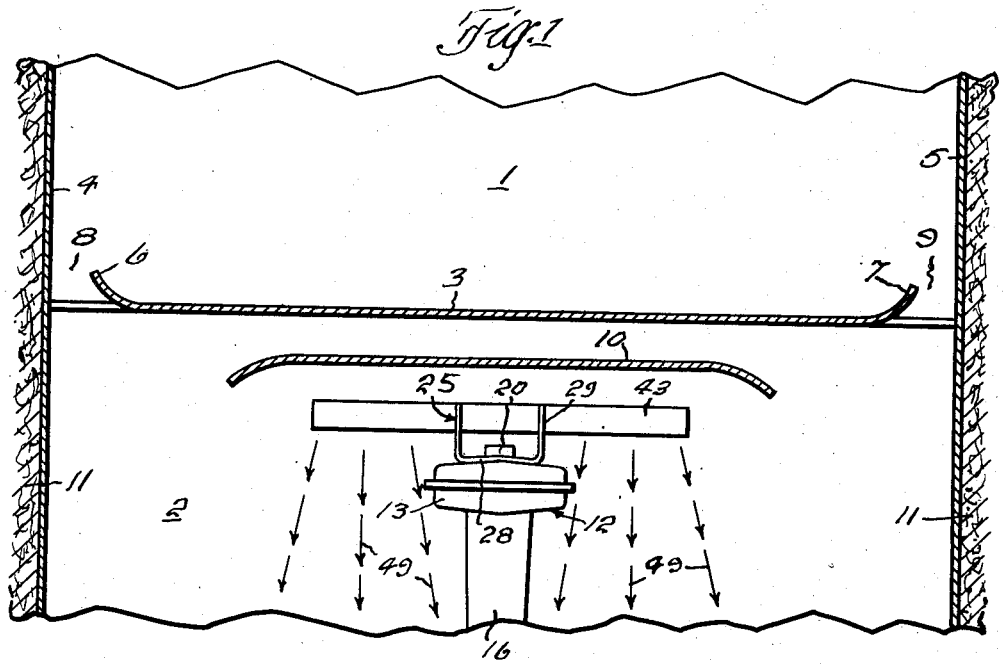
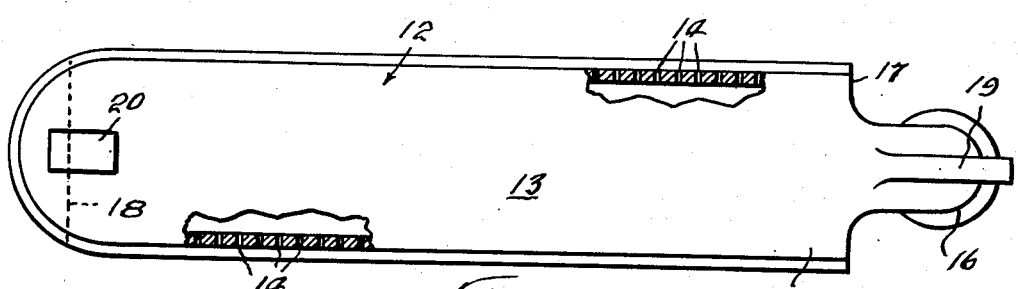
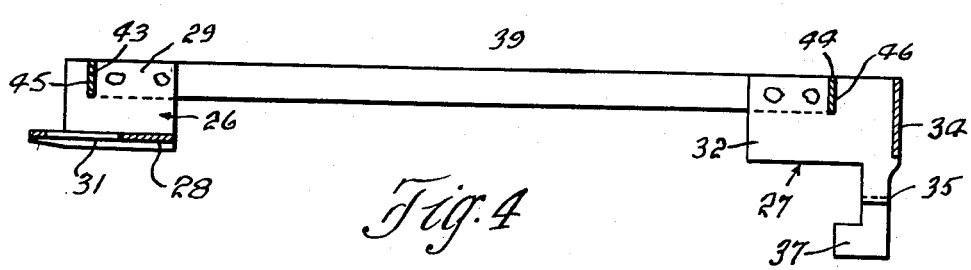
INVENTOR.
Chas. M. Mayer
BY
Chas. H. Trotter
Atty.

Aug. 18, 1953 C. M. MAYER 2,649,149
GAS-FUELED BROILER BURNER FOR COOKING RANGES
Filed Dec. 11, 1950 2 Sheets-Sheet 2
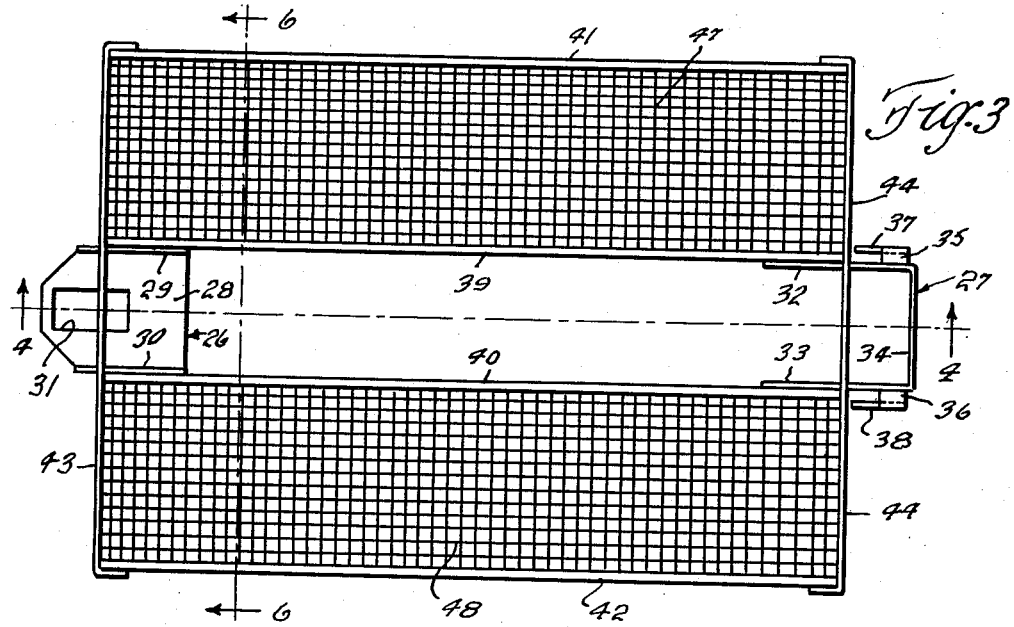
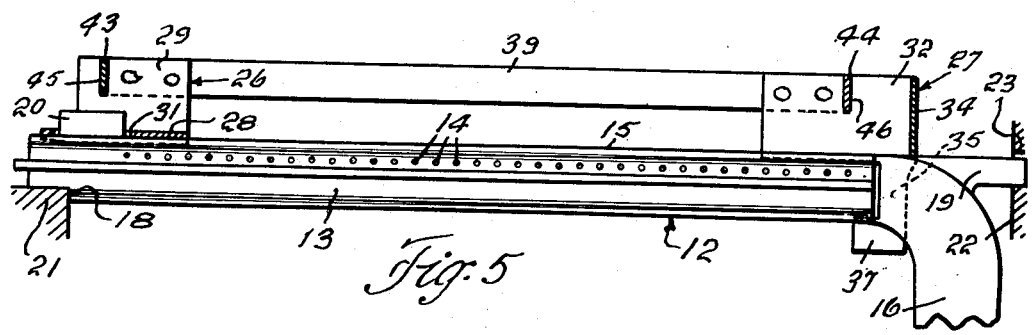
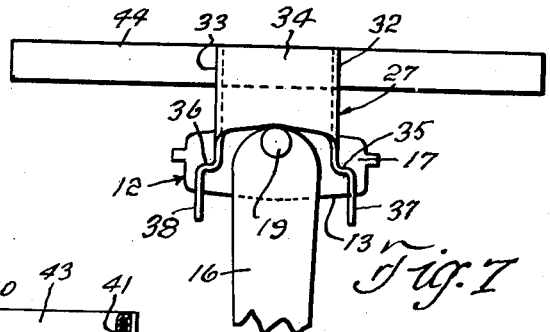
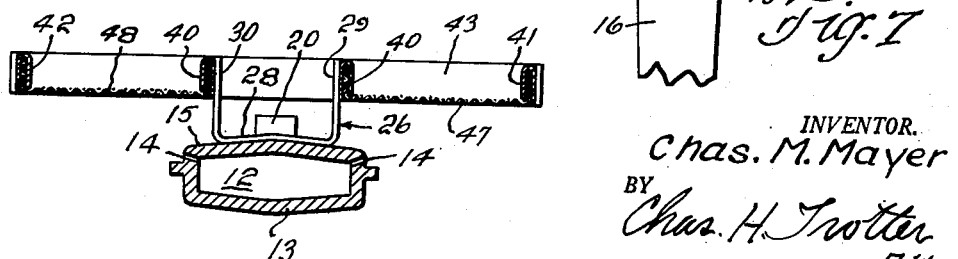
INVENTOR.
Chas. M. Mayer
BY
Chas. H. Trotter
Atty.

Patented Aug. 18, 1953

2,649,149

UNITED STATES PATENT OFFICE 2,649,149

GAS-FUELED BROILER BURNER FOR COOKING RANGES

Charles M. Mayer, Mansfield, Ohio, assignor to The Tappan Stove Company, Mansfield, Ohio, a corporation of Ohio Application December 11, 1950, Serial No. 200,202

4 Claims. (Cl. 158—113)

This invention relates generally to broiler burners of cooking ranges using gaseous fuel. More specifically the invention relates to gaseous fuel burners which are used in cooking ranges for both broiling and for heating the oven. It is a modification of the structures shown in my co-pending applications, Serial No. 146,438, filed February 22, 1950, now abandoned, and Serial No. 163,765, filed May 23, 1950, now Patent No. 2,582,642.

In cooking ranges using a single burner for both broiling and baking the broiler compartment is located directly under the oven compartment and the burner is mounted in the upper mid-section of the broiler compartment close to the underside of the thin partition which separates the broiler and oven compartments. In baking or roasting the food is placed in the oven which is heated from the broiler compartment by heated air flowing from the broiler compartment into the oven compartment around the side edges of the partition which separates the two compartments. The side edges of the dividing partition are spaced from the side walls of the compartments to provide passageways for heated air. With this arrangement the heat from the burner is diffused generally throughout the whole broiler compartment. When broiling the food is placed in the broiler compartment beneath the burner and is cooked by the rays of heat which are projected downwardly from the burner flame into contact with the food. In most cooking ranges of this type, which are in use today, it is difficult to properly broil food due to the spreading of the heat from the burner throughout the broiler compartment. It is especially difficult to broil meat so that it is seared and well cooked on the surface and yet is comparatively rare on the inside.

In order to overcome this difficulty I provide means for collecting and concentrating heat from the burner and for projecting concentrated rays of heat downwardly over a selected area. Various different means may be used for this purpose, but I prefer to use a heat resistant wire screen made from nickel chrome alloy wire. One such wire is commercially available under the tradename "Inconel" and another under the tradename "Nichrome." I have found that a 10-mesh screen of 24 gauge wire gives excellent results. Broadly this principle is old and I make no claim to the broad idea of the combination of a gaseous fuel burner and a heat collecting and concentrating means which is operative to project concentrated rays of heat downwardly over a selected area. My invention is confined to the construction and arrangement of such a means and the manner of mounting it on a burner.

The principal object of my invention is to provide a simple and efficient mechanism of this character which may be easily and inexpensively manufactured.

Another object of the invention is to provide a device of this character which may be quickly and easily applied to and removed from burners as desired.

Other and more limited objects of the invention will be apparent from the following specification and the accompanying drawings forming a part thereof wherein:

Fig. 1 is a fragmentary vertical section through the lower portion of a cooking range oven and the upper portion of the broiler compartment associated therewith, and showing my invention incorporated therein;

Fig. 2 is a plan view of the gaseous fuel burner shown in front elevation in Fig. 1, the scale of Fig. 2 being slightly larger than the scale of Fig. 1;

Fig. 3 is a plan view of my improved heat collecting and concentrating means removed from a burner, the scale of Fig. 3 being the same as the scale of Fig. 2;

Fig. 4 is a central vertical section taken on the line 4—4 of Fig. 3;

Fig. 5 is a view similar to Fig. 4 showing the heat collecting and concentrating means applied to the gaseous fuel burner shown in Figs. 1 and 2, the burner being shown in side elevation;

Fig. 6 is a transverse section taken on the line 6—6 of Fig. 3 and showing the heat collecting and concentrating means applied to a burner shown in transverse section; and Fig. 7 is an elevational view, viewed from the right of Fig. 3, showing the heat collecting and concentrating means applied to a burner which is shown in end elevation.

Referring now to the drawings, which illustrate one embodiment of my invention, by reference character, the numeral 1 indicates the oven compartment of a cooking range and the numeral 2 the broiler compartment thereof which is located directly below the oven compartment. The oven compartment 1 and the broiler compartment 2 are separated by a thin sheet metal partition 3 which constitutes the bottom of the oven compartment 1 and the top of the broiler compartment 2. The side edges of the partition 3 are turned upwardly and spaced from the side walls 4 and 5, common to both the oven compartment 1 and the broiler compartment 2, as indicated at 6 and 7 to provide passageways 8 and 9 through which heated air may flow from the broiler compartment 2 into the oven compartment 1. A baffle plate 10 is mounted in the broiler compartment 2 slightly below the partition 3 and midway between the walls 4 and 5. The walls 4 and 5 are preferably insulated as indicated at 11. A gaseous fuel burner generally indicated by the numeral 12 is suitably mounted in the upper mid-section of the broiler compartment 2 below the baffle plate 10.

The burner 12 is cast from suitable metal and comprises an elongated chambered body portion 13 having two rows of burner orifices 14, one in each side thereof adjacent the top wall 15 thereof. Gaseous fuel is supplied to the burner through a mixing tube 16 which is formed integrally with the burner body 13 and extends downwardly from the rear end 17 of the body. The underside of the forward end of the burner is shouldered as indicated at 18, and a stud 19 is formed integrally with and extends rearwardly from the upper end of the mixing tube 16. A lug 20 which is formed integrally with and extends upwardly from the mid-section of the forward end of the top 15 of the burner is provided for a purpose to be hereinafter described. The burner is held in position within the broiler compartment 2 by suitable supporting means 21 and 22. The support 21 is disposed adjacent the front of the broiler compartment 2 and engages the shoulder 18. The support 22 which is secured to or formed in the rear wall of the broiler compartment 2 has a recess 23 in which the stud 19 seats.

The heat collecting and concentrating element which is generally indicated by the numeral 25 is removably mounted on the top of the burner 12 under the baffle plate 10. It includes a pair of spaced aligned supports 26 and 27 which are adapted to seat on the top wall 15 of the burner 12, the support 26 at the forward end of the burner and the support 27 at the rear end of the burner. The front support 26 is formed from a single piece of sheet metal and comprises a base 28, shaped to the contour of the top wall 15 of the burner, and a pair of spaced upturned sides 29 and 30, one at each side of the base 28. The base 28 has a rectangular aperture 31 therethrough adjacent the forward edge thereof. The rear support 27 is formed from a single piece of sheet metal and comprises a pair of spaced parallel vertical sides 32 and 33 which are connected together at the rear ends thereof by a cross piece 34. The rear ends of the sides 32 and 33 extend outwardly and downwardly below the cross piece 34 as indicated at 35 and 36 and terminal in a pair of hooks 37 and 38. A relatively long narrow U-shaped sheet metal clamping strip 39 extends between the supports 26 and 27 and is rigidly secured, as by riveting or welding, to the outer surface of the sides 29 and 32 adjacent the upper edges thereof with the open edge of the strip facing downwardly. A similar strip 40 is similarly secured to the outer faces of the sides 30 and 33 of the supports 26 and 27. A pair of U-shaped clamping strips 41 and 42 similar to the clamping strips 39 and 40 are mounted in spaced parallel relation to the strips 39 and 40 with the open edges thereof facing downwardly, the strip 41 being disposed outwardly from the strips 39 and the strip 42 being disposed outwardly from the strip 40. The ends of the clamping strips 41 and 42 are rigidly secured to the inturned ends of a pair of spaced parallel metal end strips 43 and 44 which are carried by the supports 26 and 27, respectively. The strip 43 is mounted in a pair of aligned notches 45 in the sides 29 and 30 of the support 26, and the strip 44 is mounted in a pair of aligned notches 46 in the support 27. The lower edges of the clamping strips 39 to 42 and the end strips 43 and 44 are all disposed in substantially the same plane. A rectangular screen 47 extends between the clamping strips 39 and 41 and is secured thereto by having the upturned side edges thereof securely clamped between the legs of the clamping strips 39 and 41. A screen 48 similar to the screen 47 is similarly secured to and between the clamping strips 40 and 42. The screens 47 and 48, which are preferably 10-mesh screen woven from 24-gauge heat resistant nickel chrome alloy wire, extend substantially the full length of the clamping strips 39 to 42.

When it is desired to broil food such as a piece of steak or some chops, the heat collecting and concentrating element 25 is placed on the top of the burner 12 with the lug 20 extending up through the aperture 31, and the hooks 37 and 38 engaging the underside of the burner at the rear end 17 thereof on each side of the mixing tube 16. The lug 20 and the hooks 37 and 38 thus maintain the element 25 in proper position on the burner 12 as shown during use. In this position the screens 47 and 48 are disposed slightly above the burner 12, one at each side thereof, in position to be heated by the burner. The screens 47 and 48 absorb and collect heat and then radiate concentrated rays of heat downwardly over a selected area as indicated by the arrows 49 in Fig. 1. These concentrated rays are of such high temperature that they will quickly sear and cook the outer surface of the food, sealing in all juices, and allowing a much lesser cooking of the inner body of the food.

When the oven compartment only is used such as for baking or roasting, the element 25 can be easily removed from the burner and stored in a convenient place.

From the foregoing it will be apparent to those skilled in this art that I have provided a very simple and efficient device for accomplishing the objects of my invention, and it is to be understood that I am not limited to the specific construction shown and described herein as various modification can be made thereto within the scope of the appended claims.

What is claimed is:

1. In a device of the character described which is adapted to be removably secured to a gaseous fuel burner, the combination of a front support, a rear support spaced from said front support, each of said supports including a pair of spaced parallel upwardly extending side members, a pair of opposed notches in each of said supports, one of said notches extending downwardly from the upper edge of one of said side members and the other of said notches extending downwardly from the upper edge of the other of said side members, a pair of spaced parallel clamping strips extending between said supports and rigidly secured to the side members of said supports, a pair of spaced parallel transversely extending end strips, one of said end strips being seated in the opposed notches in the side members of said front support and the other of said end strips being seated in the opposed notches in the side members of said rear support, a second pair of clamping strips, one of said second pair of clamping strips being rigidly secured to the opposing ends of said end strips on one side of and in spaced parallel relation to said first pair of clamping strips, the other of said second pair of clamping strips being rigidly secured to the opposing ends of said end strips on the other side of and in spaced parallel relation to said first pair of clamping strips, and a pair of wire mesh screens carried by said clamping strips one on each side of said supports.

2. In a device of the character described which is adapted to be removably secured to a gaseous fuel burner, the combination of a front support, a rear support spaced from said front support, each of said supports including a pair of spaced parallel upwardly extending side members, a pair of opposed notches in each of said supports, one of said notches extending downwardly from the upper edge of one of said side members and the other of said notches extending downwardly from the upper edge of the other of said side members, a pair of spaced parallel clamping strips extending between said supports and rigidly secured to the side members of said supports, a pair of spaced parallel transversely extending end strips, one of said end strips being seated in the opposed notches in the side members of said front support and the other of said end strips being seated in the opposed notches in the side members of said rear support, a second pair of clamping strips, one of said second pair of clamping strips being rigidly secured to the opposing ends of said end strips on one side of and in spaced parallel relation to said first pair of clamping strips, the other of said second pair of clamping strips being rigidly secured to the opposing ends of said end strips on the other side of and in spaced parallel relation to said first pair of clamping strips, a pair of wire mesh screens carried by said clamping strips one on each side of said supports, and means incorporated in said supports by which said supports are removably secured in position on a burner.

3. In a device of the character described which is adapted to be removably secured to a gaseous fuel burner, the combination of a front support which comprises a base having an aperture therein and a pair of spaced parallel upwardly extending side members, a pair of opposed notches in said front support, one of said notches extending downwardly from the upper edge of one of said side members and the other of said notches extending downwardly from the upper edge of the other of said side members, a rear support comprising a pair of spaced parallel upwardly extending side members connected together at one end thereof and a pair of hooks one of which is secured to the lower edge of each of said side members, a pair of opposed notches in said rear support, one of said notches extending downwardly from the upper edge of one of said side members and the other of said notches extending downwardly from the upper edge of the other of said side members, a pair of spaced parallel clamping strips extending between said supports and rigidly secured to the side members of said supports, a pair of spaced parallel transversely extending end strips, one of said end strips being seated in the opposed notches in the side members of said front support and the other of said end strips being seated in the opposed notches in the side members of said rear support, a second pair of clamping strips, one of said second pair of clamping strips being rigidly secured to the opposing ends of said end strips on one side of and in spaced parallel relation to said first pair of clamping strips, the other of said second pair of clamping strips being rigidly secured to the opposing ends of said end strips on the other side of and in spaced parallel relation to said first pair of clamping strips, and a pair of wire mesh screens carried by said clamping strips one on each side of said supports, said hooks being adapted to engage the underside of a burner and said aperture being adapted to engage a lug on the top side of a burner to removably secure said supports in position on a burner.

4. In a device of the character described, the combination of a gaseous fuel burner, a mixing tube formed integral with said burner at the rear end thereof, a lug carried by said burner and extending upwardly from said burner at the forward end thereof, a frame, a pair of spaced supporting members rigidly secured to said frame and extending downwardly therefrom into engagement with said burner whereby said frame is maintained a fixed distance above said burner, an aperture in one of said supporting members through which said lug projects, a pair of spaced hooks extending downwardly from the other of said supporting members and engaging the underside of said burner, one of said hooks being disposed on each side of said mixing tube, and wire mesh screen means carried by said frame on each side of said burner in position to be heated by said burner.

CHARLES M. MAYER.

References Cited in the file of this patent

UNITED STATES PATENTS

| Number | Name | Date |
| --- | --- | --- |
| 2,235,886 | Kahn | Mar. 25, 1944 |

FOREIGN PATENTS

| Number | Country | Date |
| --- | --- | --- |
| 515,034 | Great Britain | Nov. 23, 1939 |
| 520,940 | Great Britain | May 8, 1940 |